(12) United States Patent
Dolder (10) Patent No.: US 6,324,382 B1
(45) Date of Patent: Nov. 27, 2001

(54) EXTRACTION OF PRIMARY AND CO-CHANNEL SIGNALS

(75) Inventor: Nicole Dolder, West Lothian (GB)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/413,607

(22) Filed: Oct. 6, 1999

(30) Foreign Application Priority Data

Oct. 12, 1998 (EP) .................................................. 98308268

(51) Int. Cl.⁷ .............................. H04B 1/10; H04B 15/00
(52) U.S. Cl. ...................... 455/63; 455/67.1; 455/67.3; 455/296; 455/304; 455/297; 455/456; 375/340; 375/342; 375/355
(58) Field of Search ..................... 455/456, 296, 455/63, 297, 67.1, 67.3, 303, 304, 501; 375/355, 347, 329, 349, 341, 340, 342, 371

(56) References Cited

U.S. PATENT DOCUMENTS

| 4,862,483 | * | 8/1989 | Clark ........................................ 375/94 |
| 5,230,076 | * | 7/1993 | Dent ........................................ 455/562 |
| 5,299,148 | * | 3/1994 | Gardner et al. ........................ 364/574 |
| 5,321,849 | * | 6/1994 | Lemson ................................. 455/67.1 |
| 5,604,503 |   | 2/1997 | Fowler et al. . |
| 5,694,428 | * | 12/1997 | Campana, Jr. ......................... 375/260 |
| 5,724,666 | * | 3/1998 | Dent ....................................... 455/562 |
| 5,727,032 | * | 3/1998 | Jamal et al. ............................ 375/347 |
| 6,038,267 | * | 3/2000 | Oura et al. ............................. 375/329 |
| 6,137,843 | * | 10/2000 | Chennakeshu et al. .............. 375/340 |

FOREIGN PATENT DOCUMENTS

| 0 491 668 | 6/1992 | (EP) . |
| 0 637 139 | 2/1995 | (EP) . |
| 0 667 683 | 8/1995 | (EP) . |
| 91/10295 | 7/1991 | (WO) . |

* cited by examiner

*Primary Examiner*—William Trost
*Assistant Examiner*—Marceau Milord (57) ABSTRACT

Apparatus for extracting a primary signal from a GSM signal containing co-channel interference partitions a signal burst into successive segments. Known characteristics of the GSM signal channel are used to estimate propagation path characteristics in respect of the first segment, and these are used to demodulate the segment. The demodulated signal is then used in a recursive process to estimate revised propagation path characteristics which are used for demodulating the subsequent segment. The demodulated segments and the estimated path characteristics are also used to derive segment signals representing the primary signal component alone, and these segment signals are used to reconstitute the primary signal. The derived primary signal can be subtracted from the received signal to extract the co-channel interfering signal. The apparatus functions with an omni-directional antenna, mounted for example on a moving vehicle.

14 Claims, 6 Drawing Sheets

EXTRACTION OF PRIMARY AND CO-CHANNEL SIGNALS

TECHNICAL FIELD

This invention relates to extraction of primary and co-channel signals, for example a primary signal and an interfering co-channel signal in a GSM mobile telephone system.

BACKGROUND ART

An important factor in implementing and managing mobile telephone systems is the determination of quality of reception by mobile units of the signals broadcast by base transceiver stations (BTSs). This determination can be valuable in identifying the cause of, for example, high levels of interruptions to calls (dropped calls) in specific geographic areas. To this end, a "drive system" is used, comprising a small test system housed in a vehicle such as a car or van. The test system typically incorporates a "test mobile" handset, independent signal receiving and measurement equipment, a geographic location system (such as a global positioning system—GPS—receiver), and a mobile computer to coordinate the operation of these devices and record the results obtained.

One significant function typically desired in a drive system is the detection, measurement and identification of co-channel signals, i.e. signals occupying the same frequency band or channel as, and interfering with, the mobile telephone system signal intended to occupy that channel.

The conventional method of co-channel detection uses a directional antenna coupled to a receiver. While the vehicle is stationary the antenna is progressively rotated stepwise through a complete circle. At each directional setting the received signal strength is recorded and if need be demodulated to identify a possible interferer. All this information then has to be combined to form a complete picture of the reception characteristics at that location. This is a very complex and time-consuming process requiring a skilled technician for what is essentially a data collection process. Another drawback of this approach is that the separate measurements are temporally uncorrelated and so cannot represent the instantaneous received signal quality. To get around this, a multiple receiver/antenna setup can be used, but this is complex and costly.

It is an object of this invention to provide a method and apparatus for extraction of primary and co-channel signals which reduce the time required for the measurement to be made and which can be used with an omni-directional antenna.

DISCLOSURE OF INVENTION

According to one aspect of this invention there is provided a method of extracting a primary signal from a composite signal containing said primary signal and a co-channel signal, comprising the steps of:
  receiving said composite signal;
  estimating at least one metric which characterises propagation conditions encountered by said primary signal, by sampling said composite signal and grouping samples according to their instantaneous rate of change of rotation in the complex plane; and
  deriving an estimate of said primary signal from said composite signal in accordance with said metric.

The invention enables a single omni-directional antenna and receiver to be used, permitting a very simple equipment setup. In one embodiment a measurement process, implemented for example by digital signal processing (DSP) software, takes a "snapshot" of the received signal and extracts from it the main signal and its associated channel distortion. These components are then analysed and detected. The whole measurement operation can be completed in seconds. Thus all the results refer to the same time instant, and provide a true picture of the instantaneous received signal quality. Furthermore, the measurement can be performed in a moving vehicle. Owing to the simplicity of equipment configuration and operation, the data collection can be carried out by a less skilled technician than is required for previous systems.

BRIEF DESCRIPTION OF DRAWINGS

A method and apparatus in accordance with this invention for extracting primary and co-channel signals in a GSM mobile telephone system will now be described, by way of example, with reference to the accompanying drawings, in which.

BEST MODE FOR CARRYING OUT THE INVENTION, & INDUSTRIAL APPLICABILITY

Figure 1:
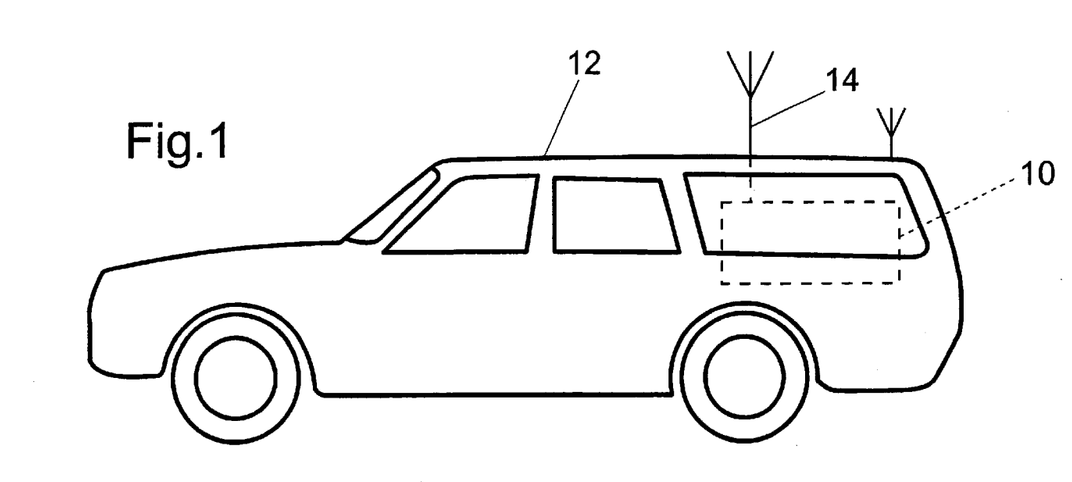
FIG. 1 is a schematic illustration of a vehicle-mounted GSM "drive system"
Figure 2:
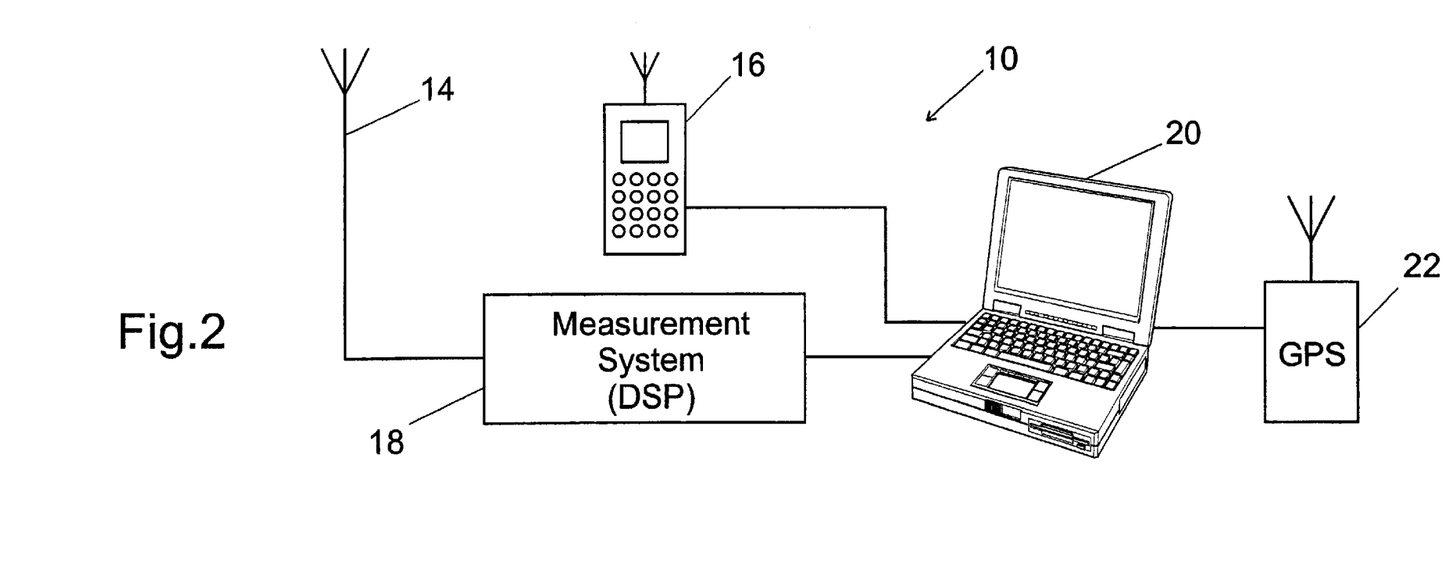
FIG. 2 is a block schematic diagram of the drive system of FIG. 1, incorporating measurement apparatus according to the present invention.

Referring to FIG. 1, a GSM drive system for determining quality of reception as a function of location in a GSM mobile telephone system comprises measurement equipment 10 mounted in a vehicle 12, and an external omni-directional antenna 14. As shown in FIG. 2, the equipment 10 has: a test mobile 16 for receiving GSM signals via a respective antenna; a measurement system 18 incorporating a DSP for detecting and measuring selected characteristics of the signals from the antenna 14; a mobile computer 20 for collecting and analysing information received from the test mobile 16 and the measurements made by the measurement system 18; and a GPS receiver 22 also connected to the computer 20 to enable measurements to be referred to specific geographic location.

The measurement system 18 contains appropriate electronic circuitry for receiving and conditioning the signals (e.g. at intermediate frequency) from the antenna 14. For convenience the signals are then converted to digital form using an analogue-to-digital converter (ADC) and supplied to a DSP for further processing in accordance with software or firmware program instructions stored in memory in the measurement system 18 and defining required manipulations of the signals to yield the desired measurements. If desired, of course, some of these manipulations could alternatively be implemented in the analogue domain by means of corresponding purpose-designed circuit hardware.

The system 18 is able to perform a wide variety of measurements; those of interest in the present context relate to detection of interference, especially as a result of the presence of co-channel signals, i.e. signals having the same frequency as an expected (primary) signal at a given geographic location, but which should not be detectable at that location. Co-channel signals can result, for example, from erroneous allocations of operating frequency to BTSs in neighbouring cells of a cellular mobile telephone system, from unexpected signal propagation conditions causing signals to be received at a greater distance then expected, or from faulty operation of transmitting equipment.

A GSM signal is located in either the 890–915 MHz band (uplink to a BTS) or the 935–960 MHz band (downlink to a mobile station), and occupies a frequency channel 200 kHz wide. Signals are transmitted in bursts each occupying one timeslot 576.9 microseconds in duration, and comprising 156.25 symbol periods each 3.692 microseconds long. 148 of these symbol periods are used for transmitting actual symbols, and the remaining 8.25 symbol periods comprise a guard interval separating successive timeslots. Eight successive timeslots constitute a frame. At least some symbols in each burst of 148 symbols have a fixed data pattern called a mid-amble used for synchronising the GSM network. The size of the mid-amble depends on the type of timeslot: in particular, "synchronisation bursts" (SCH bursts) have 64 mid-amble symbols and "traffic bursts" have 26 mid-amble symbols.

Figure 3:
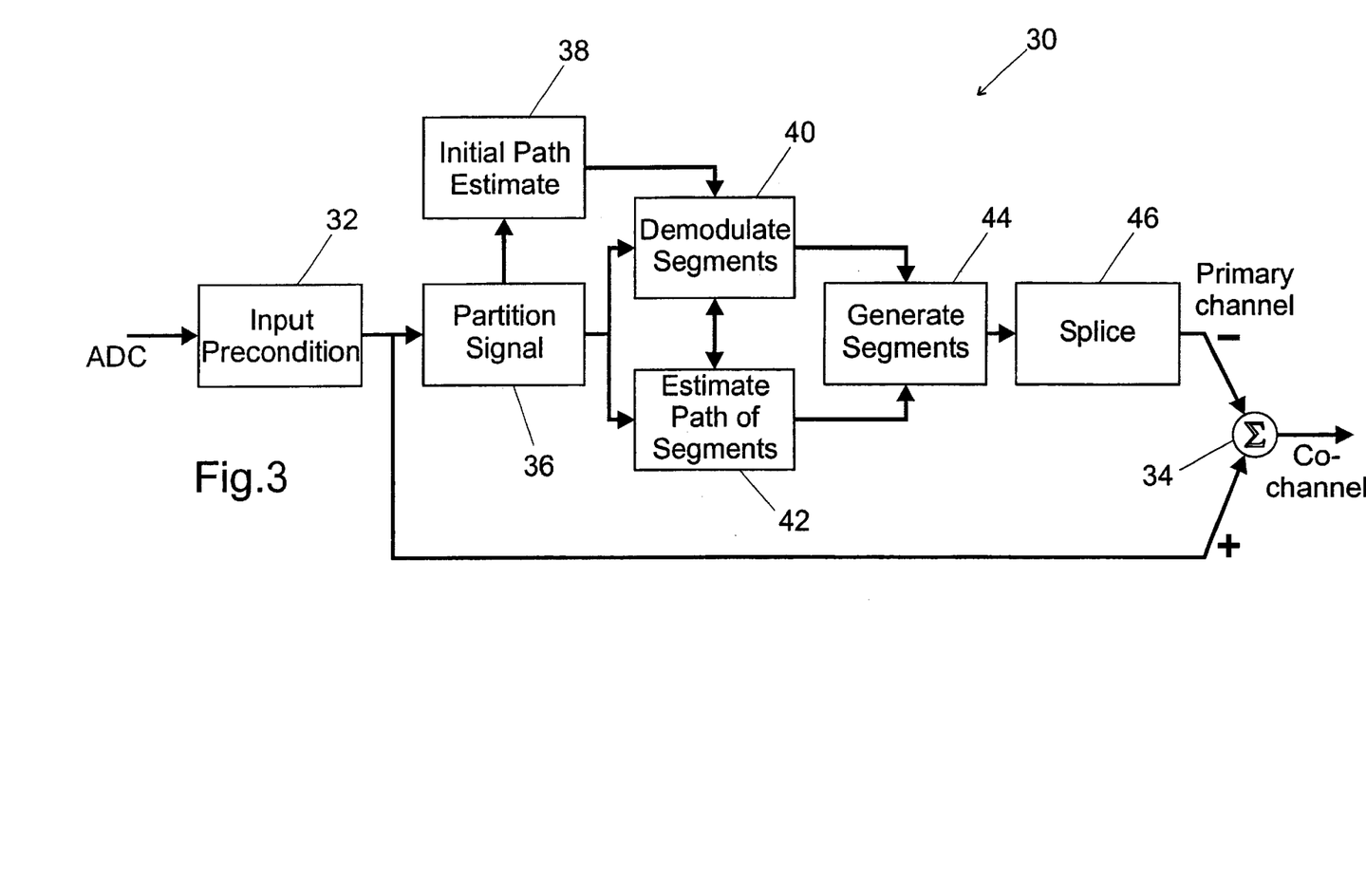
FIG. 3 is an overall block schematic diagram of the measurement apparatus.

FIG. 3 shows measurement apparatus 30 incorporated in the measurement system 18, for detecting and measuring primary and co-channel signals. The primary task of this apparatus is to estimate the principal component of a mobile communications signal (the primary signal) and the characteristics or metrics of the propagation path it has traversed. This estimated signal is reconstructed and removed from the signal as received, and the residual signal comprises the co-channel signal, if one is present.

Referring to FIG. 3, digitised intermediate frequency (IF) signals are received from the ADC by an input preconditioner 32, which converts them to in-phase (I) and quadrature-phase (Q) signal components, at a sample rate of four times the GSM symbol rate (625 samples per timeslot). The I/Q signal pair takes two paths: one path leads to the primary signal and path analysis process, and the other path leads to a signal summer 34. A second input to this summer is the estimate of the primary signal, incorporating the propagation path estimate. The primary signal estimate is subtracted from the received signal to leave a residual signal, which contains any interfering co-channel signal. This separation process allows both the primary transmitted signal and any co-channel signal then to be treated separately for measurement and identification purposes.

Before the I/Q signal pair produced by the preconditioner 32 is used in the primary signal and path analysis process, it must be partitioned into smaller segments, where the size of a segment meets predetermined quasi-stationary multipath requirements (i.e. the equivalent distance of two consecutive segments—the distance travelled by light in the duration of two segments—must be less than the signal wavelength). In the GSM case, the inherent timeslot structure described above meets this criterion. The position of the SCH burst which occurs every 10 or 11 frames in the GSM signal is used to divide the signal up into partitions, in a partition circuit 36. During the subsequent analysis process, only a portion of this partition (a "segment") is used.

Initially each partition has a standard length, equal to the length of a timeslot (625 samples), but this may change based on analysis results. A segment is the useful part of the burst in a timeslot, after omission of two "tail" symbols at the start and end of the burst and the guard period, and is the section of a partition over which analysis is performed; thus a segment comprises 576 samples (144 symbols). A "transition band" comprises the part of a partition that is used in determining how the various segments are rejoined after analysis; initially it comprises the tail symbols at the end of one burst, the guard symbols and the tail symbols at the start of the following burst (49 samples, corresponding to 12.25 symbols). A partition therefore consists of one segment and one transition band.

The SCH burst is passed by the partition circuit 36 to an initial path estimator 38, and the whole of each segment is passed to a demodulator 40 and a path estimator 42. The output of these two circuits is used by a segment generator 44 to reconstruct an estimated segment signal which corresponds to the primary signal alone, modified by its propagation path. These signal segments are then rejoined by a splice circuit 46 to produce the primary signal estimate supplied to the summer 34.

The path estimation process is recursive, the analysis for each burst segment except for the first) being based on the path estimates derived for the preceding segment. For the first segment, the initial path estimator 38 uses known signal characteristics of the fixed pattern mid-amble to find a carrier frequency offset error, sample timing and a set of path metrics (described in more detail below). These parameters form the initial values for the recursive part, involving the demodulator 40 and the path estimator 42, of the analysis process, which proceeds as follows:

1. Using the previous segment's set of path estimates (or, for the first segment, the initial path estimates), demodulate the current segment.
2. With symbol patterns provided by the demodulator 40, generate mapping information relating these symbol patterns to the concurrent instantaneous rate of change of rotation in the I/Q plane of an ideal input signal, and a reference signal.
3. Calculate a new set of path metrics.
4. Reconstruct an estimated signal that will match the segment's primary component plus propagation path distortion.

Each reconstructed segment signal is removed from the input I/Q signal pair to create a residual component (which holds the co-channel). Using path estimates for the signal on either side of the gap between successive segments (i.e. the guard band), a new gap signal is reconstructed, so that successive segments of the reconstructed signal can be spliced together. This reconstructed gap signal is also removed from input signal.

By separating the input signal into a primary signal, its path metrics and a residual signal as described above, the apparatus can function with signals received via an omni-directional antenna (the filtering effect of a directional antenna is not required). Thus there is no need for the time-consuming process of repeating measurements for each of numerous increments of angular orientation of a directional antenna. As well as saving time, this enables the measurement to represent conditions at a specific instant in time, and permits measurements to be made in a moving vehicle.

Figure 4:
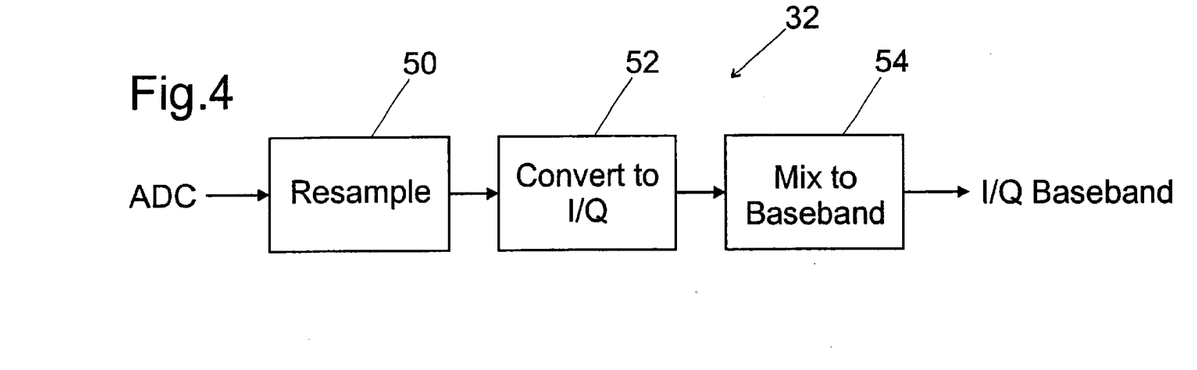
FIG. 4 is a block schematic diagram of an input preconditioning block of FIG. 3.

The component blocks of FIG. 3 will now be described in further detail, starting with the input preconditioner 32 which is shown in FIG. 4. Referring to FIG. 4, digitised signals from the ADC are fed to a resampler 50 which converts from the ADC sampling rate (e.g. 1 Msample/s) to the desired sample rate of four times the GSM symbol rate. The required I and Q signals in the complex domain are derived from the resampled signal in the real domain by an I/Q converter 52, using a Hilbert transform. Finally a mixer 54 shifts the signal from IF to baseband.

Figure 5:
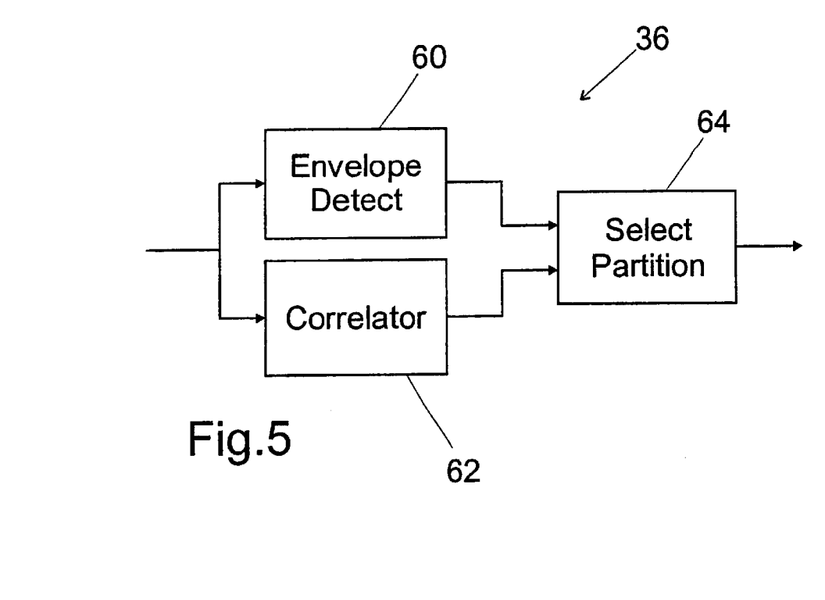
FIG. 5 is a block schematic diagram of a signal partitioning block of FIG. 3.

FIG. 5 shows the partition circuit 36. This includes an envelope detector 60 which uses peak detection to identify the portion of the I/Q signal pair which exceeds a predetermined signal level, and thus locate the start and finish of each signal burst. A correlator 62 locates the mid-amble of the SCH burst within the signal by reference to its fixed data pattern. Given the position of the signal samples in the I/Q pair corresponding to the mid-amble and to the end points of the burst, the samples comprising the burst can be distributed among partitions in a partition selector 64.

Figure 6:
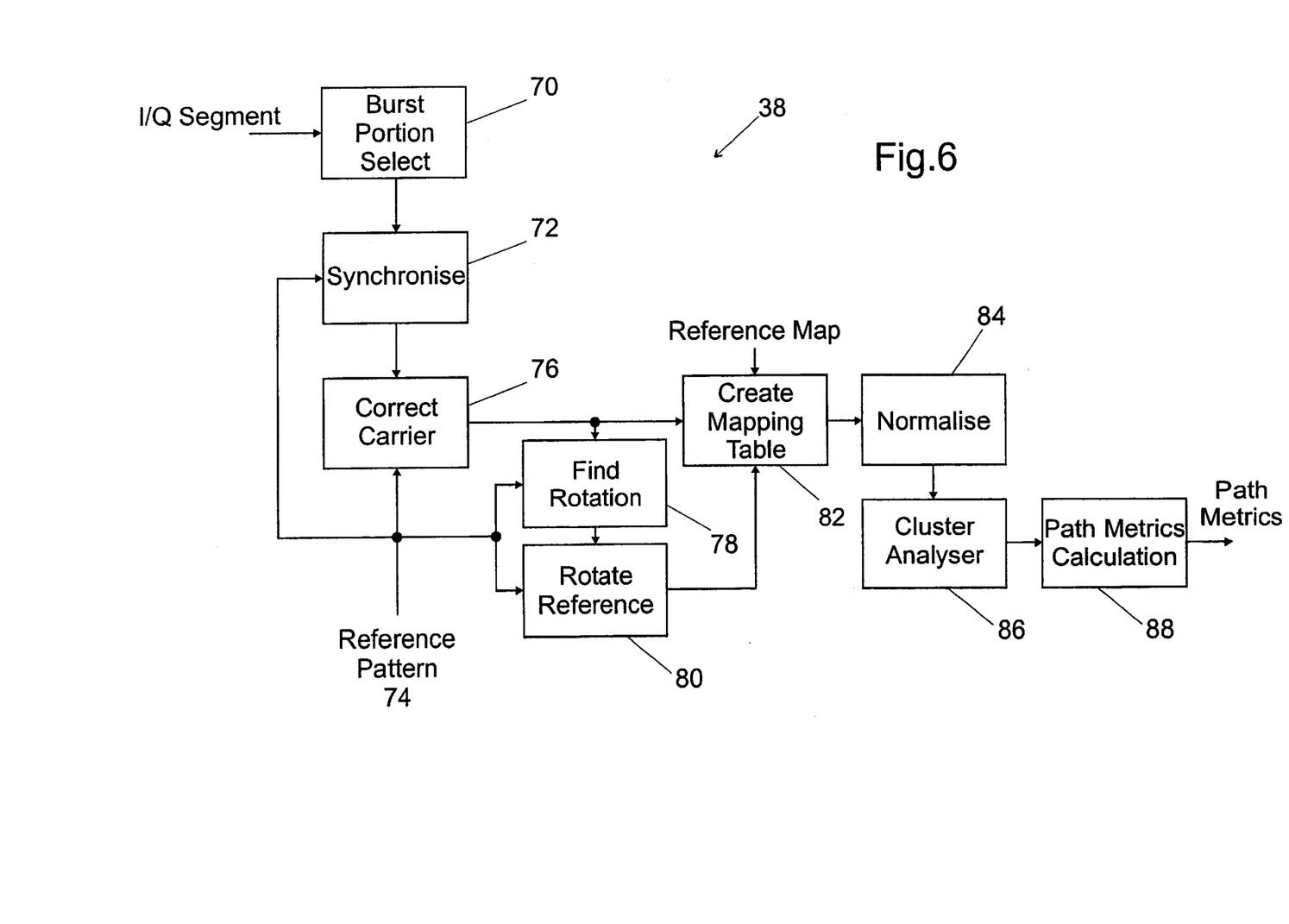
FIG. 6 is a block schematic diagram of an initial path estimator of FIG. 3.

The initial path estimator 38 is shown in FIG. 6. The I/Q signal pair samples for the first burst segment to be analysed are supplied to a burst portion selector 70, which extracts the mid-amble samples in this segment. These samples are passed to a synchronisation block 72 which compares the signal with the fixed SCH mid-amble data pattern provided as a reference signal 74 (in I/Q format), to locate the mid-amble to within a quarter symbol period (i.e. to the nearest sample). Next a correct carrier circuit 76 determines any carrier error in frequency and phase across the mid-amble and corrects it.

At this stage the location of the mid-amble in the signal burst is known to within a quarter sample, and any carrier frequency error has been largely removed. However, in the I/Q plane the sampled signal is rotated with respect to the reference because their phase relationship is presently unknown. Accordingly a find rotation circuit 78 determines the best fit difference angle in the I/Q plane between the reference pattern signal 74 and the sampled signal from the carrier correct circuit 76. A rotate reference circuit 80 then applies an angular offset in the I/Q plane to the reference pattern signal 74 so that the sampled signal and the rotated reference signal have a close angular match.

Next the samples are grouped according to their instantaneous rate of change of rotation in the I/Q plane. Since the rotated reference pattern signal 74 and the sampled signal are aligned in the I/Q plane, the input samples can be grouped by reference to the corresponding samples of the reference pattern signal. A mapping process 82 performs this grouping to derive a mapping table.

A normaliser 84 removes the message content from the grouped input signal samples. Each input sample is rotated in the I/Q plane by an amount that would rotate the respective reference sample to the real axis (complex number 1+0i). The signal samples, which would normally have angular positions in the I/Q plane determined by the message content, have now been fixed at a location adjacent the real axis. The positions of these rotated signal samples in the I/Q plane form clusters, where a cluster corresponds to a specific rate of rotation in the I/Q plane. The grouping process performed by the mapping process 82 has mapped each sample to its corresponding cluster group.

A cluster analyser 86 analyses the shape of each cluster and finds its centre. If the input signal is simply corrupted by gaussian noise, for example, the sample positions are randomly distributed within an ellipse. The location of the center of this ellipse is an estimate of the path of the primary signal component, free of any effects caused by any co-channel signal.

If on the other hand a co-channel signal has corrupted the input signal, the sample positions form a ring (i.e. not randomly distributed within an ellipse, but concentrated towards its circumference). The location of the centre of this ring is again an estimate of the path of the primary signal component, free of any effects caused by any co-channel signal. Thus the effect of the co-channel has been removed as if it were noise.

Standard statistical techniques (such as taking the mean position of the samples along the I and Q axes) are used to locate the centres of these circles and rings. The sample positions which form a co-channel ring are not necessarily evenly distributed around the ring, so this statistically determined centre may be offset from the best-fit position, reducing the accuracy of estimation of the primary signal, Other more sophisticated techniques may be used if desired, involving for example a neural network to analyse the cluster shape, find the circle which best fits the cluster, and then determine the circle centre numerically. The neural network may accomplish this by using character recognition pattern matching techniques to compare the cluster shape with the letter O, and determine the parameters defining the degree of fit of the cluster shape with that letter. This technique yields more parameters than in the case of simple statistical analysis, for example the overall shape of the cluster, the radius of the best-fit ellipse and the thickness of the ellipse circumference. These parameters may be used for example to improve the demodulation process.

A path metrics calculation circuit 88 uses the centre location co-ordinates in the I/Q plane of all these clusters to calculate the amplitude of an ideal signal (real axis), by identifying a point on the real (I) axis which is an optimal least-squares fit to the set of cluster center locations. A set of complex multipliers that describe these locations with respect to this ideal is then obtained by dividing each center's location by the co-ordinates of the ideal signal point. The ideal signal amplitude and the complex multipliers collectively constitute the required path metrics.

Figure 7:
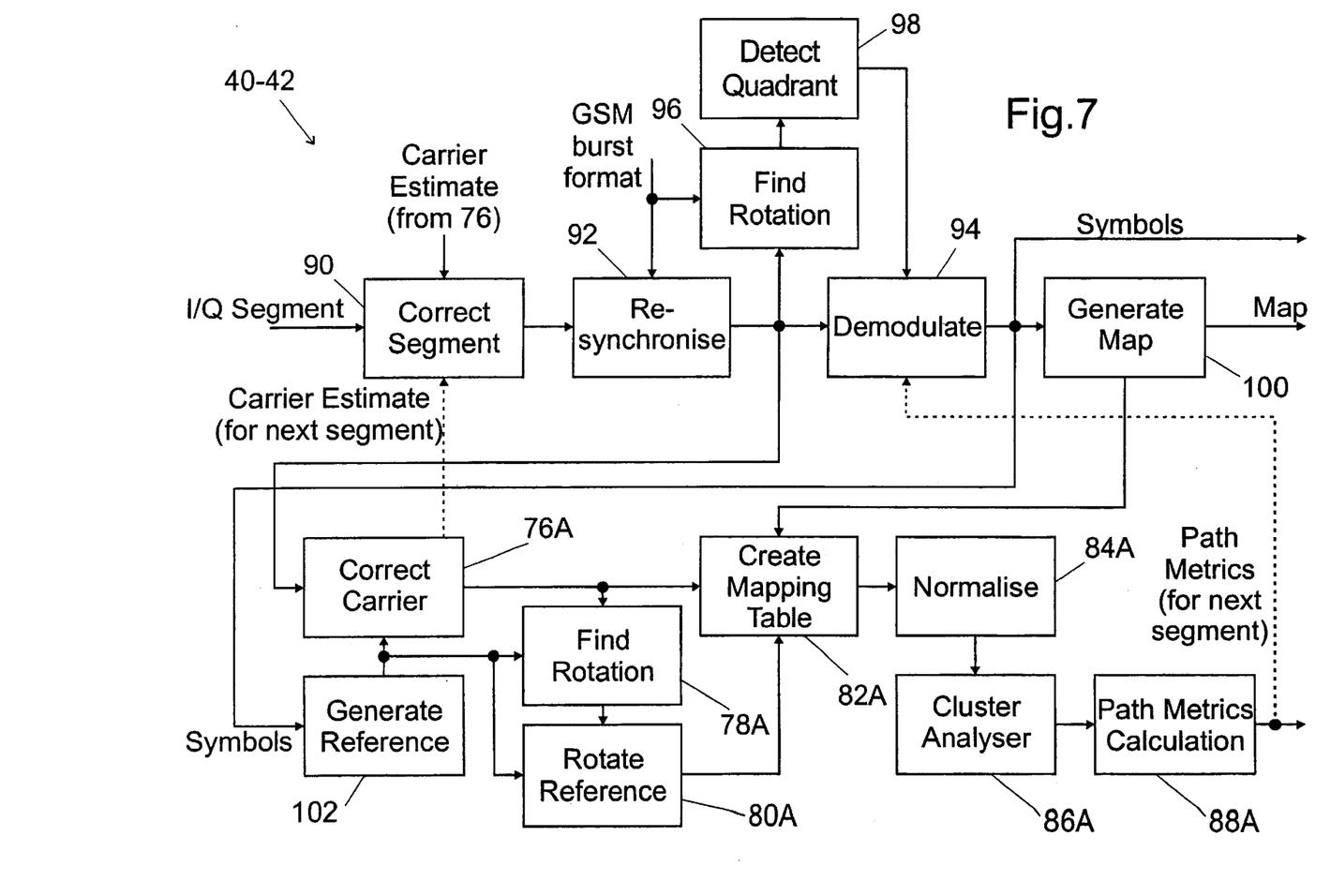
FIG. 7 is a block schematic diagram of a main path estimator of FIG. 3.

FIG. 7 shows the demodulator 40 and main path estimator 42. This estimator is similar in operation to the initial path estimator 38, but whereas in the latter a fixed, known reference pattern is used, the main path estimator 42 constructs a dynamic reference based on the demodulator output and previous path estimates. Those stages of the main path estimator 42 which are direct counterparts of stages shown in FIG. 6 have corresponding reference numerals, but with a letter A appended.

Referring to FIG. 7, the I/Q signal pair samples for the second and subsequent burst segments are supplied to a segment correction circuit 90, which uses the carrier estimate for the previous segment (produced by the correct carrier circuit 76 for the first segment, and the corresponding circuit 76A for subsequent segments) to correct the current segment for any carrier error.

In principle the duration of a GSM timeslot is, as noted above, 156.25 symbol periods; practical experience has shown that although this is the average timeslot duration, individual timeslots can vary in duration about this mean. Accordingly, a re-synchronisation circuit 92 uses information about the GSM burst format to re-synchronise the segment signal by adjusting its timing within a range of the duration of a few samples, and to recalculate the partition structure.

The adjusted segment signal is supplied to a demodulator stage 94 which uses conventional maximum likelihood sequence estimation (MLSE) techniques, with the path metrics being used to produce an effect similar to that of an equaliser. The demodulator stage 94 has to be phase aligned with the input signal, and, since it operates in the I/Q domain, it therefore needs knowledge of how the input signal is rotated in this plane. Circuitry for finding this rotation (96) and detecting the I/Q quadrant occupied by the rotated signal (98) jointly provide this information. The demodulator stage 94 has as inputs the re-synchronised complex input signal, the path estimates for the previous segment, and the signal rotation information. Its output is the demodulated, and if need be corrected, symbol pattern contained in the burst segment.

This symbol pattern is provided to a map generator 100, a reference pattern generator 102, and the segment generator 44 (FIG. 3). The map generator 100 creates a sample-to-group mapping table using the demodulated symbol pattern; this table is used by the mapping process 82A to derive input for the normaliser 84A, and by the segment generator 44.

The reference pattern generator 102 uses the demodulated symbol pattern to derive a reference signal which has no carrier or sample timing errors. This reference signal is used by the correct carrier circuit 76A, the find rotation circuit 78A and the rotate reference circuit 80A to process the re-synchronised segment signal from the re-synchroniser 92. Subsequent processing proceeds as for the correspondingly labelled stages of the initial path estimator 38 in FIG. 6.

Figure 8:
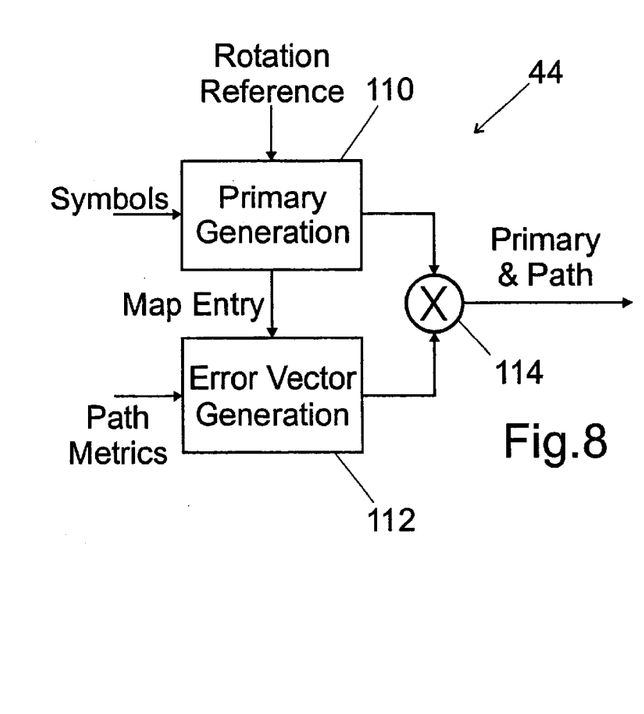
FIG. 8 is a block schematic diagram of a segment generator of FIG. 3.

The segment generator 44 is shown in FIG. 8. The signal produced by this circuit comprises a primary signal, which is the strongest signal component, and a signal that represents the cumulative effects of the propagation path. This path signal differs from noise and/or co-channel contributions to the received signal in that it is correlated essentially with the primary component. Referring to FIG. 8, a primary generation circuit 110 is similar to the reference pattern generator 102, but uses the rotation reference signal from the rotate reference circuit 80A to produce a primary signal adjusted in phase and amplitude to match the input signal's strongest component. An error vector generator 112 selects a complex multiplier from the path metrics signal supplied by the path metrics calculation circuit 88A (FIG. 7), in accordance with the relevant mapping table entry identified by the primary generation circuit 110 from the rotation reference signal. A multiplier 114 combines the primary signal with the selected complex multiplier to generate a signal corresponding to that which would be received following multi-path propagation from a single transmitter.

Figure 9:
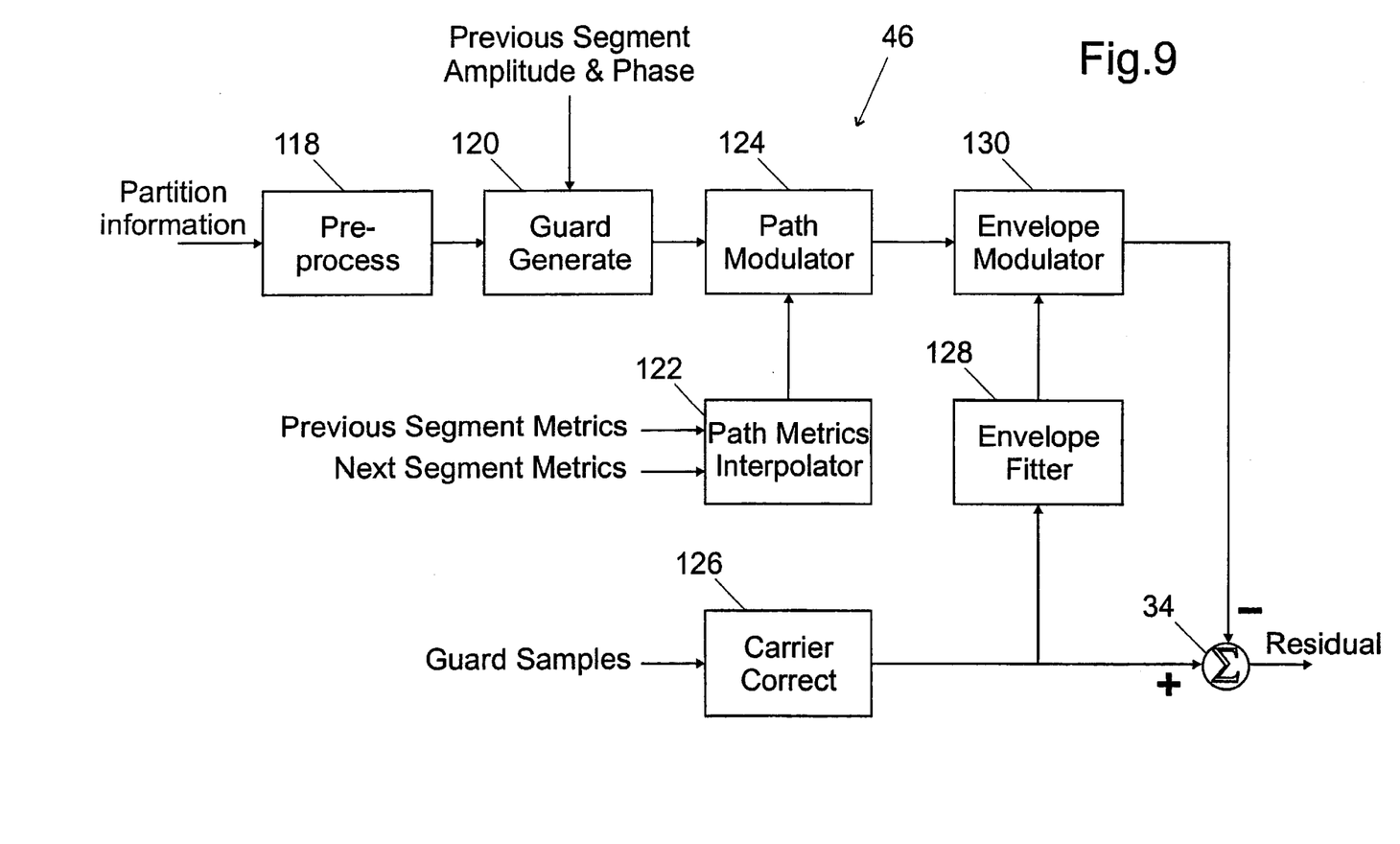
FIG. 9 is a block schematic diagram of a splice circuit of FIG. 3.

The splice circuit 46 is shown in FIG. 9. The purpose of this circuit is to assemble individually estimated segments from the segment generator 44 to produce a complete gap-free signal. The signal samples which form the transition band (as defined above) consist, in the case of GSM, of the guard bits and a small overlap of the segments on either side of these bits.

Referring to FIG. 9, a pre-processor 118 first examines each transition band to determine its length and envelope, to take account for example of the above-mentioned variation in timeslot duration about its mean value.

A guard generator 120 uses this information to produce an error-free signal at constant amplitude, set to match the amplitude of the previous segment's primary component. A small frequency offset is applied so that the phase at the start and end of the segment matches that of the previous and following segments respectively (each segment's carrier frequency is estimated independently).

A path metrics interpolator 122 creates a path metrics signal by interpolation between the previous segment's path metrics and those for the following segment, to produce a path metric which shifts between those metrics through the duration of the transition band. This interpolated signal is supplied to a path modulator 124 which applies it to the transition band signal from the generator 120. The modulator's output is a path-modulated transition band signal that has the amplitude of the previous segment, but is phase aligned with both adjacent segments.

A carrier correction circuit 126 removes the carrier error from the transition band (i.e. guard band) samples in the original sampled I/Q signal. These new samples have the same carrier slope as that applied by the guard generator 120. An envelope fitter 128 peak detects these new I/Q samples, and finds an envelope curve which is a best fit (smooth fit) to this envelope. Finally an envelope modulator 130 modulates the path-modulated transition band signal from the path modulator 124 in accordance with this estimated signal envelope curve.

The envelope modulator's output signal is then subtracted by the signal summer 34 as described above from the received signal I/Q pair (with the carrier offset removed by the carrier correction circuit 126) to produce the residual signal representing any co-channel interference.

As an alternative to splicing in this manner, the individually estimated segments can be assembled by bridging each gap between them with the corresponding portion of the input signal as was received during the interval of occurrence of the gap.

The path metrics can be used to derive additional information about the primary signal component, such as any channel distortion (e.g. multi-path distortion) affecting it.

What is claimed is:

1. A method of extracting a primary signal from a composite signal containing said primary signal and a co-channel signal, comprising the steps of:

receiving said composite signal;

estimating at least one metric which characterises propagation conditions encountered by said primary signal, by sampling said composite signal, decoding samples, and grouping the decoded samples according to their instantaneous rate of change of rotation in the complex plane with reference to content of the decoded samples; and deriving an estimate of said primary signal from said composite signal in accordance with said metric.

2. The method according to claim 1, wherein the co-channel signal is extracted from the composite signal by subtracting the estimated primary signal from the composite signal.

3. The method according to claim 1, wherein the composite signal is a GSM signal.

4. The method according to claim 1, wherein said samples are grouped by reference to corresponding samples of a reference pattern of symbols modulating said primary signal.

5. The method according to claim 1, wherein the grouped samples are normalised to remove any information content.

6. The method according to claim 4, wherein the grouped samples are normalised by rotation in the complex plane by an amount that would rotate the respective reference samples to the real axis of the complex plane.

7. The method according to claim 1, wherein the grouped samples are analysed to determine at least one parameter of a sample group.

8. The method according to claim 7, wherein a sample group is generally elliptical, and the parameter determined is the location of the centre of the ellipse in the complex plane.

9. The method according to claim 8, wherein the mean position of the samples along the axes of the complex plane is determined to derive said location.

10. The method according to claim 7, wherein said grouped samples are analysed by pattern matching to compare the distribution of samples to a letter O.

11. The method according to claim 10, wherein said pattern matching is performed by using a neural network.

12. Apparatus for extracting a primary signal from a composite signal containing said primary signal and a co-channel signal, comprising:

a receiver for receiving said composite signal;

an estimator for estimating at least one metric which characterises propagation conditions encountered by said primary signal, by sampling said composite signal, decoding samples, and grouping the decoded samples according to their instantaneous rate of change of rotation in the complex plane with reference to content of the decoded samples; and a signal generator for deriving an estimate of said primary signal from said composite signal in accordance with said metric.

13. The method according to claim 1, wherein the samples are rotated after data demodulation and decoding, and the rotation is effected with reference to bit patterns of the samples.

14. The apparatus according to claim 12, wherein the samples are rotated after data demodulation and decoding, and the rotation is effected with reference to bit patterns of the samples.

* * * * *